United States Patent Office 3,598,787
Patented Aug. 10, 1971

3,598,787
MOULDING COMPOSITIONS CONTAINING
THERMOPLASTIC POLYESTERS
Walter Herwig, Frankfurt am Main, and Klaus Weissermel, Kelkheim, Taunus, Germany, assignors to Farbwerke Hoechst Aktiengesellschaft vormals Meister Lucius & Brüning, Frankfurt am Main, Germany
No Drawing. Filed Mar. 6, 1969, Ser. No. 804,992
Claims priority, application Germany, Mar. 26, 1968,
P 17 69 049.2
Int. Cl. C08g 39/04
U.S. Cl. 260—75
14 Claims

ABSTRACT OF THE DISCLOSURE

Thermoplastic moulding compositions on the basis of linear saturated polyesters containing alkali metal salts of cyclic boric acid esters. The compositions have usually good crystallization properties.

---

The present invention relates to moulding compositions containing thermoplastic polyesters and having outstanding crystallization properties.

Crystalline shaped articles can be made by injection moulding polyesters of aromatic dicarboxylic acids and aliphatic or cycloaliphatic diols. Injection moulding of polyethylene terephthalate has gained industrial importance. The unmodified polyester has, however, a poor stability of shape. When it is heated it shrinks considerably, above all at temperatures above the second order transition temperature owing to after-crystallization, it loses its shape and becomes unsightly. It has, therefore, repeatedly been proposed to add crystallization promoting substances to polyethylene terephthalate.

According to British Pat. No. 1,104,089 inorganic substances such as calcium carbonate or titanium dioxide having a particle size of less than 2 microns are used as crystallization promoting substances. In German Pat. No. 1,182,820 it has been proposed to mix polyesters with polypropylene or poly-4-methylpenten-1. In general, a satisfactory inorganic nucleation requires a nucleating agent of a very narrow distribution of the particle size. However grinding begets problems. When polymers are used as crystallization promoting substances, objects of improved stability of shape are obtained which, however, is still unsatisfactory for many purposes.

It has now been found that thermoplastic moulding compositions consisting of (a) linear saturated polyesters of aromatic dicarboxylic acids and optionally small amounts of aliphatic dicarboxylic acids with saturated aliphatic or cycloaliphatic diols and (b) 0.05 to 1.5% by weight, preferably 0.08 to 0.8% by weight, calculated on the polyester, of alkali metal salts, advantageously sodium salts, of cyclic boric acid esters have excellent properties.

Suitable cyclic boric acid esters are preferably

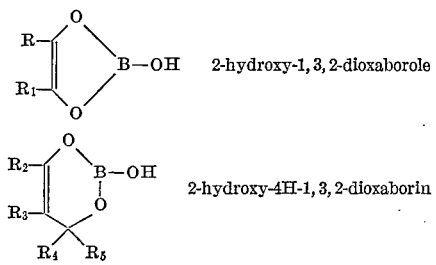

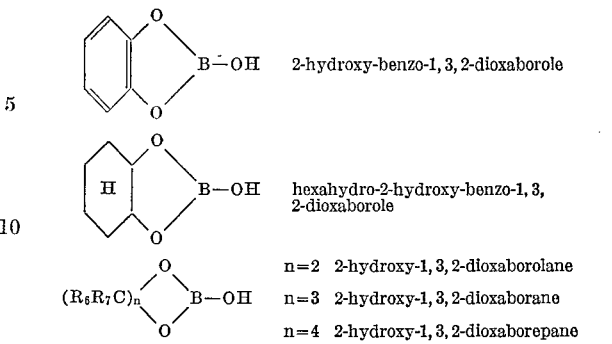

in which R, $R_1$, $R_2$, $R_3$, $R_4$, $R_5$, $R_6$ and $R_7$ each stands for hydrogen or an aliphatic hydrocarbon radical having 1 to 4 carbon atoms, for example methyl, ethyl, isopropyl, n-butyl.

The alkali metal salts which, according to the invention, can be used either individually or in admixture with one another, can be obtained from the hydroxy compounds with alkali metal alcoholates, for example sodium methylate, or from orthoboric acid alkylene ester anhydrides in the presence of alkali metal hydroxides.

When the compositions according to the invention are processed into injection moulded articles they exhibit extremely good crystallization properties. The articles removed from the generally heated moulds of the injection moulding machine, for example gear wheels or sheets, have a constant degree of crystallization which is practically independent of the residence time in the heated mould. With the alkali metal salts added according to the invention products are obtained having a degree of crystallization of about 35 to 40%. The crystallinity can be determined directly by measuring density. A polyethylene terephthalate having a density of 1.372 has, for example, a crystallinity of 35% whereas a polyethylene terephthalate having a density of 1.378 has a crystallinity of 40%. When the densities of a polyester modified with an alkali metal borate are determined, it is found that with the accuracy of measurement attained they are independent of the dwell time generally used in injection moulding. This is a very important fact since in this manner the undesired after-crystallization of the shaped articles at higher temperatures is avoided. Moreover, the industrial advantage in injection moulding is of decisive importance because short residence times in the mould permit a short injection cycle and increase the economy of the process.

It is of special advantage that the alkali metal salts to be used according to the invention need not be finely ground. Simple pulverization of the salts, for example in a mortar or in a simple mill, is generally sufficient, especially when alkyl-substituted dioxaboranes are used. Sodium 4,4-dimethyl-6-methyl-1,3,2-dioxaboranate, for example, is soluble in a polyester melt, for example a melt of polyethylene terephthalate, so that an extremely fine distribution even of a coarsely crystalline salt is ensured. An additional advantageous effect is the improved mould release properties of the compositions according to the invention so that further additions, for example of a wax, may be dispensed with. When a polyethylene terephthalate containing 0.3% by weight of sodium 4,4-dimethyl-6-methyl-1,3,2-dioxaboranate is injected into a mould heated at 140° C., the sheets obtained can be easily removed after a dwell time of 2 seconds. The densities of the sheets are found to be 1.374 to 1.377. Sheets removed from the mould after a dwell time of 60 to 90 seconds, respectively, have the same densities.

As polyester, polyethylene terephthalate is used in the first place. Other polyesters may also be used, for example polycyclohexane-1,4-dimethylol terephthalate, or polyesters which contain as acid component, in addition to terephthalic acid, up to 5 mole percent of other aromatic or aliphatic dicarboxylic acids, for example isophthalic acid, naphthalene-2,6-dicarboxylic acid or adipic acid, and as alcoholic component, in addition to ethylene glycol, up to 30 mole percent of other aliphatic diols, for example 2,2-dimethyl-propane-diol-(1,3) or butane-diol-(1,4). Polyesters of hydroxycarboxylic acids may also be used. The polyesters have a reduced specific viscosity of from 0.6 to 2.0 dl./g., preferably 0.9 to 1.6 dl./g. measured with a 1% solution in a 60:40 mixture of phenol and tetrachloroethane at 25° C. Especially good results are obtained with polyesters having a reduced specific viscosity of from 1.1 to 1.5 dl./g.

When the polycondensation is terminated the alkali metal salt can be deposited in suitable manner on the surface of the ground or granulated polyester, for example in the form of a powder by subjecting the mixture to rotation in a suitable vessel. Alternatively, it may be sprayed in the form of a solution on to the polyester granules and the solvent can be removed under reduced pressure or at elevated temperature. To obtain an especially homogeneous mixing of the components it is advantageous to melt in an extruder the polyester powder or granules coated with the boron compound and to granulate the mixture after cooling. It is likewise possible to add the alkali metal salt during condensation in the molten state of the polyester.

To obtain unobjectionable injection moulded articles the polyester moulding composition should contain as little moisture as possible, preferably at most 0.01% by weight. When a rapid crystallization in the mould and a short injection cycle is to be reached, the mould should be maintained at a temperature of at least 100° C., mould temperatures of from 120 to 150° C. being preferred.

The following examples serve to illustrate the invention but they are not intended to limit it thereto, the parts being by weight unless otherwise stated.

EXAMPLE 1

1,000 parts of granulated polyethylene terephthalate having a relative specific viscosity of 1.32 dl./g. were subjected to rotation for one hour with 3 parts of sodium 4,4-dimethyl-6-methyl-1,3,2-dioxoboranate

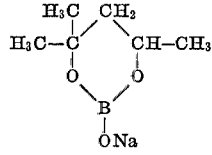

The coated polyethylene terephthalate was homogenized in an extruder at a temperature of 275° C. and granulated. The granules were dried and injection moulded into sheets of dimensions 60 x 60 x 2 mm. The following conditions were maintained constant:

cylinder temperatures: 270° C./260° C./260° C.
temperature of the mould: 140° C.
injection time: 15 seconds
injection pressure: 140 atmospheres gauge
pressure during dwell time: 70 atmospheres gauge The dwell time was varied. The results are indicated in the following table.

EXAMPLE 2

A polyester moulding composition was prepared as described in Example 1 with the exception that 4 parts of sodium 4,6-dimethyl-1,3,2-dioxaboranate

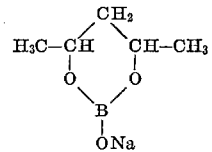

were used for 1,000 parts of polyethylene terephthalate.

The values obtained with injection moulded sheets are indicated in the table.

| Dwell time, seconds | 2 | 60 |
|---|---|---|
| Density | 1.376 | 1.375 |
| Reduced specific viscosity [1] | 1.04 | 1.05 |
| Mould release | Unobjectionable | |
| Surface | Unobjectionable | |

[1] Same as in previous table.

What is claimed is:
1. A thermoplastic moulding composition comprising
  (a) as a linear saturated polyester, polyethylene terephthalate or polycyclohexane-1,4-dimethylol terephthalate or polyethylene terephthalate which contains as additional alcohol component up to 30 mole percent of 2,2-dimethyl-propane-diol-(1,3) or butane-diol-(1,4) or any of the above polyesters which contains as additional acid component up to 5 mole percent of isophthalic acid, naphthalene-2,6-dicarboxylic acid or adipic acid, said polyester having a reduced specific viscosity from 0.6 to 2.0 dl./g., measured in a 1% solution in a 60:40 mixture of phenol and tetrachloroethane at 25° C., and
  (b) 0.05 to 1.5% by weight calculated on basis of the polyester of an alkali metal salt of cyclic boric acid ester selected from a group consisting of

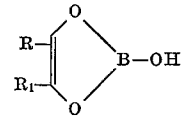

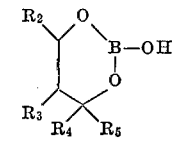

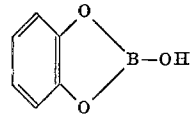

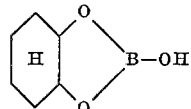

and

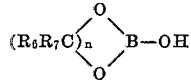

| Dwell time, seconds | 2 | 5 | 10 | 15 | 30 | 45 | 60 | 90 |
|---|---|---|---|---|---|---|---|---|
| Density | 1.375 | 1.375 | 1.374 | 1.373 | 1.375 | 1.376 | 1.374 | 1.376 |
| Specific viscosity [1] | 1.09 | 1.07 | 1.08 | 1.05 | 1.05 | 1.06 | 1.09 | 1.07 |
| Mould release | Unobjectionable | | | | | | | |
| Surface | Plane and smooth | | | | | | | |

[1] Relative specific viscosity measured with a 1% solution in a 60:40 mixture of phenol and tetrachloroethane at 25° C.

in which R, $R_1$, $R_2$, $R_3$, $R_4$, $R_5$, $R_6$ and $R_7$ each stands for hydrogen or an aliphatic hydrocarbon radical having 1 to 4 carbon atoms.

2. A thermoplastic moulding composition as claimed in claim 1, wherein component (a) is polyethylene glycol terephthalate.

3. A thermoplastic moulding composition as claimed in claim 1, wherein component (a) is polycyclohexane-1,4-dimethylol terephthalate.

4. A thermoplastic moulding composition as claimed in claim 1, wherein component (a) contains up to 5 mole percent of an acid selected from the group of isophthalic acid, naphthalene-2,6-dicarboxylic acid and adipic acid.

5. A thermoplastic moulding composition as claimed in claim 1, wherein component (a) contains up to 30 mole percent of a diol selected from the group of 2,2-dimethyl-propane-diol-(1,3) and butane-diol-(1,4).

6. A thermoplastic moulding composition as claimed in claim 1, wherein component (a) has a reduced specific viscosity of from 0.9 to 1.6 dl./g., measured with a 1% solution in a 60:40 mixture of phenol and tetrachloroethane at 25° C.

7. A thermoplastic moulding composition as claimed in claim 1, wherein component (a) has a reduced specific viscosity of from 1.1 to 1.5 dl./g., measured with a 1% solution in a 60:40 mixture of phenol and tetrachloroethane at 25° C.

8. A thermoplastic moulding composition as claimed in claim 1, wherein component (b) is added in an amount of from 0.08 to 0.8% by weight.

9. A thermoplastic moulding composition as claimed in claim 1, wherein component (b) is selected from the group consisting of the sodium salts of 2-hydroxy-1,3,2-dioxaborole, 2-hydroxy-4-H-1,3,2-dioxaborin, 2-hydroxy-benzo-1,3,2-dioxaborole and hexahydro-2-hydroxy-benzo-1,3,2-dioxaborole.

10. A thermoplastic moulding composition as claimed in claim 1 wherein component (b) is a sodium salt of

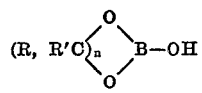

which compound when
$n=2$ is 2-hydroxyl-1,3,2-dioxaborolane,
$n=3$ is 2-hydroxy-1,3,2-dioxaborane,
$n=4$ is 2-hydroxy-1,3,2-dioxaborepane,
and in which formula R and R' each represent hydrogen or an aliphatic hydrocarbon radical having 1 to 4 carbon atoms.

11. A thermoplastic moulding composition as claimed in claim 1, wherein component (b) is sodium 4,4-dimethyl-6-methyl-1,3,2-dioxaboranate.

12. A thermoplastic moulding composition as claimed in claim 1, wherein component (b) is sodium 4,6-dimethyl-1,3,2-dioxaboranate.

13. A thermoplastic moulding composition as claimed in claim 1, wherein component (b) is the sodium salt of 2-hydroxy-1,3,2-dioxaborane of the general formula

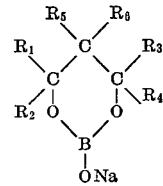

in which $R_1$, $R_2$, $R_3$, $R_4$, $R_5$ and $R_6$ each stand for hydrogen or an aliphatic hydrocarbon radical having 1 to 4 carbon atoms, at least two of the radicals $R_1$ to $R_6$ being alkyl groups.

14. Injection moulded articles made from the thermoplastic moulding compositions claimed in claim 1.

References Cited

UNITED STATES PATENTS

| | | | |
|---|---|---|---|
| 2,909,560 | 10/1959 | McManimie | 260—462 |
| 3,163,506 | 12/1964 | Steinberg et al. | 44—76 |
| 3,361,672 | 1/1968 | Andress et al. | 252—49.6 |

MELVIN GOLDSTEIN, Primary Examiner

U.S. Cl. X.R.

264—328